United States Patent
Phillips et al.

(10) Patent No.: US 11,853,998 B2
(45) Date of Patent: Dec. 26, 2023

(54) PERSONALIZED QR CODES FOR ATM AUTHENTICATION

(71) Applicant: Capital One Services, LLC, McLean, VA (US)

(72) Inventors: Jeremy J. Phillips, Brooklyn, NY (US); Ashay Sheth, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/926,380

(22) PCT Filed: Apr. 14, 2021

(86) PCT No.: PCT/US2021/027247
§ 371 (c)(1),
(2) Date: Nov. 18, 2022

(87) PCT Pub. No.: WO2021/236261
PCT Pub. Date: Nov. 25, 2021

(65) Prior Publication Data
US 2023/0186277 A1 Jun. 15, 2023

Related U.S. Application Data

(63) Continuation of application No. 16/878,357, filed on May 19, 2020, now Pat. No. 10,997,581.

(51) Int. Cl.
*G06Q 20/32* (2012.01)
*G07F 19/00* (2006.01)
*G06Q 20/10* (2012.01)

(52) U.S. Cl.
CPC ..... *G06Q 20/3276* (2013.01); *G06Q 20/1085* (2013.01); *G07F 19/204* (2013.01); *G07F 19/207* (2013.01)

(58) Field of Classification Search
CPC ............ G06Q 20/3276; G06Q 20/1085; G07F 19/204; G07F 19/207
(Continued)

(56) References Cited

U.S. PATENT DOCUMENTS 9,412,106 B2    8/2016  Laracey
9,911,120 B2 *  3/2018  Laracey ............. G06Q 20/1085
(Continued)

OTHER PUBLICATIONS

Search Report dated May 4, 2021 for International Appl. No. PCT/US2021/027247, 2 pages.
(Continued)

*Primary Examiner* — Daniel A Hess
(74) *Attorney, Agent, or Firm* — Sterne, Kessler, Goldstein & Fox P.L.L.C.

(57) ABSTRACT

Disclosed herein are system, method, and computer program product embodiments for creating a personalized barcode for an account holder at an Automated Teller Machine (ATM). An embodiment operates by storing account holder unique data and a first rule for generating a personalized barcode unique to the account holder based on the account holder unique data. After receiving a request for completion of a transaction from the first account holder, placing the account holder unique data and the first rule in a pairing service. Thereafter, the ATM is configured to retrieve the account holder unique data and the first rule from the pairing service, generate the first personalized barcode based on the first rule and the account holder unique data, and present the first personalized barcode to the first account holder.

18 Claims, 12 Drawing Sheets

(58) Field of Classification Search
USPC .......................................................... 235/379
See application file for complete search history.

(56) References Cited

U.S. PATENT DOCUMENTS

| | | |
|---|---|---|
| 9,922,370 B2 | 3/2018 | Kobres et al. |
| 10,325,087 B1 | 6/2019 | Goodsitt et al. |
| 10,997,581 B1 | 5/2021 | Phillips et al. |
| 11,423,389 B2 * | 8/2022 | Phillips ................ G07F 19/204 |
| 2007/0295805 A1 | 12/2007 | Ramachandran |
| 2012/0047070 A1 | 2/2012 | Pharris |
| 2012/0173311 A1 | 7/2012 | Chang et al. |
| 2019/0073663 A1 | 3/2019 | Jamkhedkar et al. |
| 2019/0108731 A1 | 4/2019 | Hazard et al. |
| 2020/0074442 A1 | 3/2020 | Kulkarni et al. |
| 2020/0302755 A1 | 9/2020 | Edwards et al. |
| 2020/0351264 A1 | 11/2020 | Pellizzer et al. |

OTHER PUBLICATIONS

Written Opinion dated May 4, 2021 for International Appl. No. PCT/US2021/027247, 4 pages.

\* cited by examiner

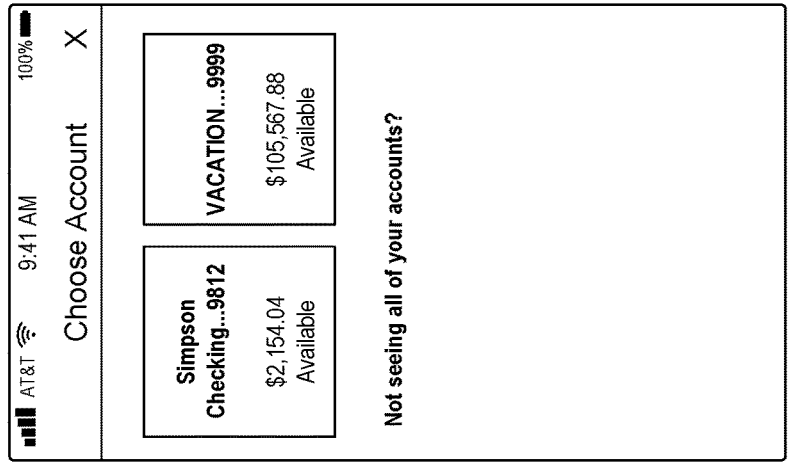
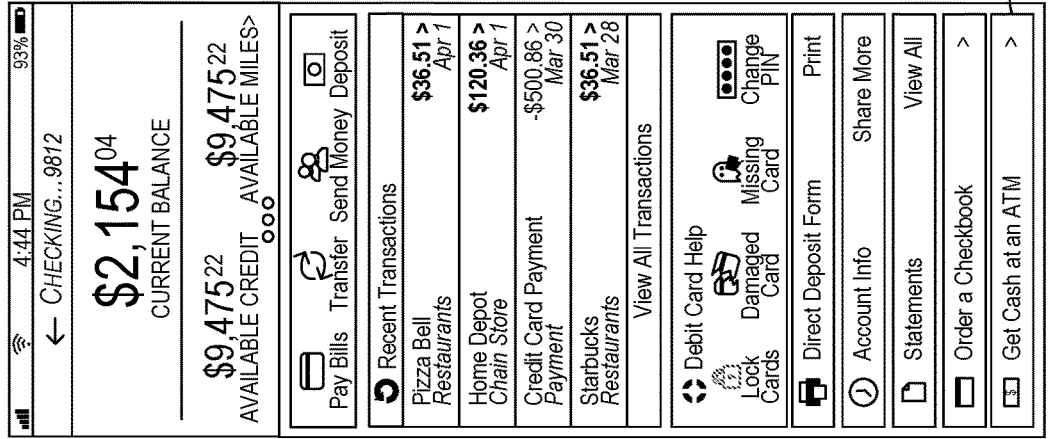
FIG. 4B
FIG. 4A

400D

```
.ıll AT&T 🛜          9:41 AM           100% 🔋
              Confirm Details           X Get cash from:
Checking Account ....9812               ∨
$2,154.04 Available Amount:                                 ∨
$20

[ Confirm Details ]
```

```
.ıll AT&T 🛜          9:41 AM           100% 🔋
              Choose Amount             X Get cash from:
Checking Account ....9812               ∨
$2,154.04 Available Amount:                                 ∨
$20

Choose Amount          Done $20
                  $40
                  $60
```

FIG. 4C

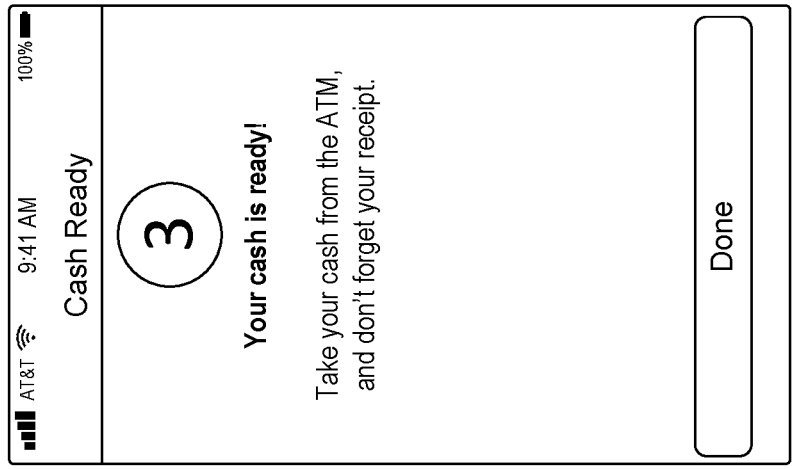
FIG. 4H
FIG. 4G

PERSONALIZED QR CODES FOR ATM AUTHENTICATION

BACKGROUND

Users are more readily using mobile devices to perform banking transactions. As a result, users are relying more on their bank's mobile application to serve as a primary source for their banking transactions. Consequently, for banking transactions that cannot be completed solely on the bank's mobile application (e.g., withdrawing cash), users are seeking new ways to efficiently initiate and complete such banking transactions. Along these lines, users expect a way to complete transactions requested on their bank's mobile application without compromising their security.

BRIEF DESCRIPTION OF THE DRAWINGS/FIGURES

The accompanying drawings are incorporated herein and form a part of the specification.

FIGS. 4A-4H illustrate user interfaces of an example application installed on the user device of FIG. 1, according to some embodiments.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for completing a transaction initiated on a user device using a personalized barcode. The transaction may be initiated on a mobile application installed on a mobile device and requested to be completed at an Automated Teller Machine (ATM). As such, instead of using a physical card unique to the user to complete the transaction at the ATM, a personalized barcode unique to the user of the user device may be automatically presented on the ATM. The user of the user device may take an image of the personalized barcode using the user device's camera. And based on authenticating the user, the transaction may be completed at the ATM without the use of the physical card.

Figure 1:
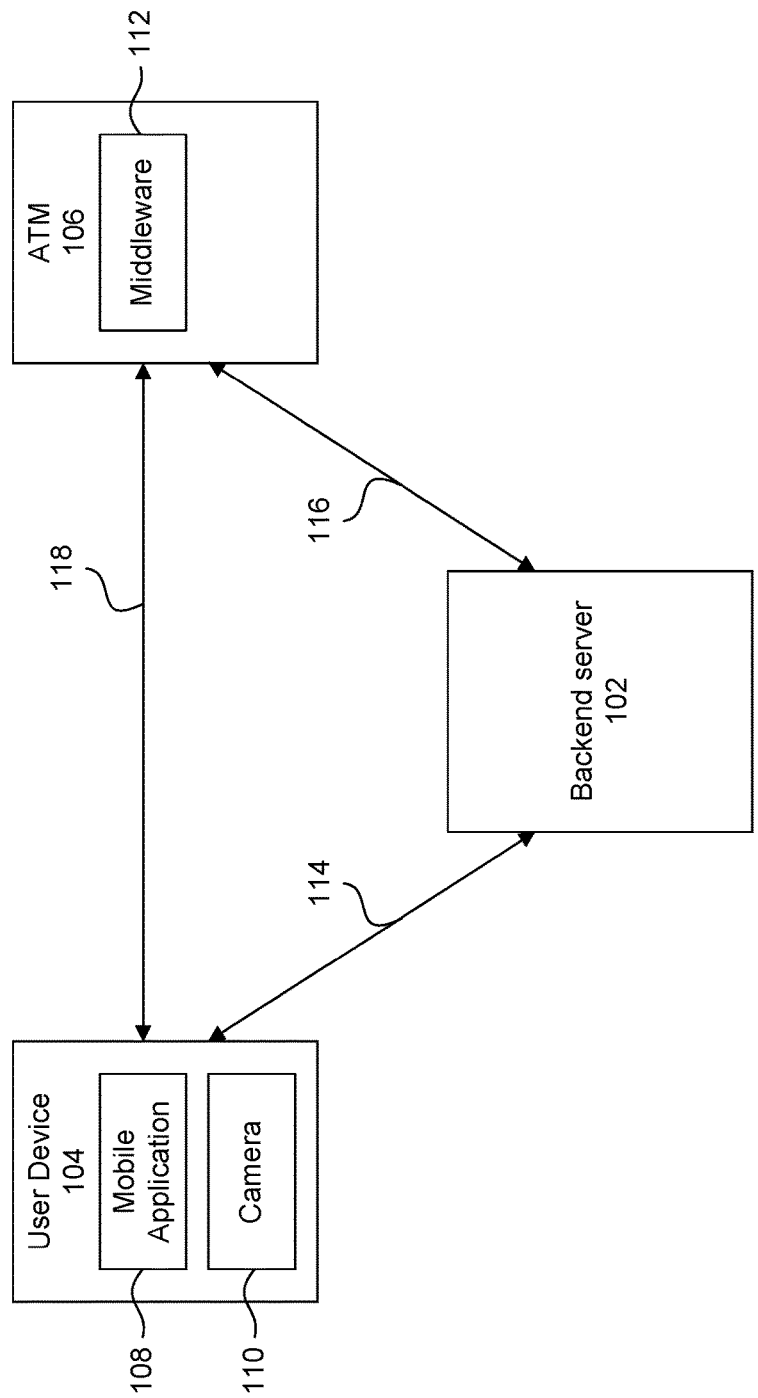
FIG. 1 illustrates a block diagram of a system for completing a transaction using a personalized barcode, according to some embodiments.

FIG. 1 illustrates a system 100 for completing a transaction at a device using a personalized barcode, according to some embodiments. In some embodiments, system 100 may include backend server 102, user device 104, and/or Automated Teller Machine (ATM) 106. Backend server 102 may be managed by an entity (e.g., a banking institution), which may be associated with a wide range of users. As such, backend server 102 may be in communication with a network of ATMs, including ATM 106, which may be managed by the same or a different entity managing backend server 102, over a public or private communication line or medium 116. Backend server 102 may also be in communication with users (e.g., account holders) associated with the entity managing backend server 102 via a mobile application 108 installed on user device 104 over a public communication line or medium 114.

The mobile application 108 may allow a user to request the completion of a transaction (e.g., withdrawing money) at ATM 106 without a physical card that is unique to the user and associated with the user's affiliation with the entity managing backend server 102. For example, the physical card may permit the user to access a bank account with a financial institution. Along these lines, user device 104 may be in communication with ATM 106 over a public communication line or medium 118.

Backend server 102 may store unique information for users (e.g., account holders). The unique information may be personal information. For example, the unique information may be an address, a bank balance, a social security number, a home phone number, a mobile a phone number, a home address, a work address, and a marital status, just to name a few examples. The unique information may also be an alphanumeric text or an image selected by the user.

Backend server 102 may also store or generate rules for generating and presenting the personalized barcode. In some embodiments, the rules may be received from an authorized administrator of backend server 102. In some embodiments, the rules be may automatically or randomly generated by backend server 102. For example, new rules may be automatically generated on predetermined intervals (e.g., hourly, daily, or weekly). In some embodiments, the rules may be generated based on unique information received from ATM 106. As such, each ATM 106 may have different unique information associated therewith. This unique information may be a number of users visiting ATM 106 daily, a location of ATM 106 (in a city or suburb), and a number of fraudulent attempts on ATM 106, just to name a few examples.

The rules for generating the personalized barcode may specify how to generate (or create) the personalized barcode to present unique user information. For example, if the unique user information is a particular year, the rule would specify how to generate a personalized barcode that presents the particular year. Similarly, if the unique user information is a user's face, the rule would specify how to generate a personalized barcode that presents the user's face. Likewise, if the unique user information is a user's year of birth, the rule would be how to generate a personalized barcode that presents the user's year of birth.

Along these lines, the rules for generating the personalized barcode may also specify the unique user information to encode in the personalized barcode. The encoded unique user information may be different than the presented unique user information. As will be discussed in more detail below, the encoded user information may be used to authenticate the user at the ATM 106 via user device 104. For example, the encoded unique user information may be an account number (e.g., bank account number) associated with the user, which may be provided by an entity (e.g., a financial institution) managing backend server 102. The encoded unique user information may also be a state identification number (e.g., a driver's license number), a birth date, a phone number, a physical address, a phone number, and a social security number, just to list a few examples.

The rules for presenting the personalized barcode may provide guidelines for presenting the personalized barcode at ATM 106. The guidelines may be randomly selected by backend server 102 or may be preselected by an authorized administrator of backend server 102. As such, the guidelines may be (i) when the personalized barcode should be presented, (ii) how long the personalized barcode is to be presented, and (iii) how the personalized barcode should be moved when presented on ATM 106 (e.g., blinking, rotating, traversing, flashing, and increasing/decreasing in size), just to name a few examples. For example, in some embodiments, a guideline may be to present the personalized barcode at ATM 106 as a security measure after the user provides some type of input (e.g., user name, password, or scanning of an initial, generic barcode). In some embodiments, a guideline may be to present the personalized barcode when the user is within a predefined distance of ATM 106 (e.g., 1.5 feet).

Further, backend server 102 may generate updated and new rules for generating and presenting the personalized barcode. The updated rules may be in a form of a new version of the previous rule (e.g., Rules 1.1, 1.2, 2.1, 2.2). In some embodiments, the updated and new rules may be requested from ATM 106. In some embodiments, the updated and new rules may be sent from backend server 102 to ATM 106 without a request from ATM 106. The backend server 102 may do so at predetermined intervals (e.g., hourly, weekly, monthly).

As such, the updated and new rules for generating the personalized barcode may provide a new personalized barcode for the user. The updated rules for generating the personalized barcode may present the same unique user information (e.g., an image of a user) while changing the arrangement of the blocks or lines making up the personalized barcode. The new rules for generating the personalized barcode may provide new unique user information to be generated for the personalized barcode. For example, whereas the previous personalized barcode generated a birthdate of a user, the new personalized barcode may generate a home address for the user.

Further, the updated and new rules for presenting the personalized barcode may allow the personalized barcode to be presented in a different fashion. As such, the updated rules may modify a current rule. For example, if the current rule states that the personalized barcode is to be displayed for 30 seconds, the updated rule may state that the personalized barcode is to be displayed for 45 seconds. And the new rules may completely replace the previous rules. For example, if the previous rule was to rotate the personalized barcode, the new rule may be flash the personalized barcode.

Backend server 102 may also generate an identifier unique to the user. The identifier unique to the user may be any numeric or alphanumeric string. And the identifier unique to the user may be assigned by an entity (e.g., financial institution) managing the backend server 102. As such, backend server 102 may associate the identifier unique to the user with user data (e.g., information unique to the account holder and rules for generating/presenting the personalized barcode).

Figure 2:
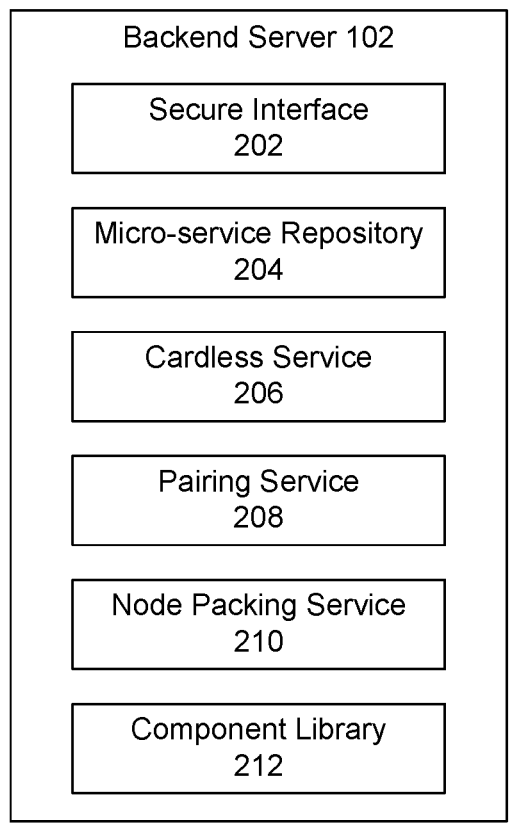
FIG. 2 illustrates a block diagram of an example backend server 102 of FIG. 1, according to some embodiments.

Backend server 102 may then generate the personalized barcode or send the rules for generating the personalized barcode along with the unique user information to ATM 106 or pairing service 208 (of FIG. 2). For example, in some embodiments, backend server 102 may generate the personalized barcode based on the rules for generating the personalized barcode. Thereafter, backend server may then send the personalized barcode, along with the rules for presenting the personalized barcode and/or the identifier unique to the user, to ATM 106 or pairing service 208. Moreover, in some embodiments, backend server 102 may send unique user information, rules for generating the personalized barcode, rules for presenting the personalized barcode, and an identifier unique to the user to ATM 106 or pairing service 208.

User device 104 may be a personal computer (e.g., desktop laptop, notebook) or a consumer device (e.g., mobile device, personal digital assistant (PDA), smartphone, tablet). User device 104 may have a mobile application 108 provided by backend server 102. As such, mobile application 108 may permit a user to initiate a transaction and/or to request a completion of the transaction at ATM 106, as will be discussed in more detail below. Moreover, mobile application 108 may be provided and/or managed by an entity managing backend server 102. In some embodiments, mobile application 108 may be managed by a banking institution, which also manages backend server 102, and may permit a user to request to withdraw cash (e.g., at ATM 106).

User device 104 may also have a camera 110. Camera 110 may permit a user to acquire an image of the personalized barcode at ATM 106. In some embodiments, mobile application 108 may provide access to camera 110 to permit a user to acquire an image of the personalized barcode at ATM 106. In some embodiments, mobile application 108 may provide a time stamp on an image acquiring the personalized barcode so that backend server 102 or ATM 106 may confirm that the image is acquired at a time a user was at ATM 106.

In some embodiments, user device 104 may decode the personalized barcode based on the image of the personalized barcode. In some embodiments, user device 104 may send an image of the personalized barcode, alone or along with the timestamp, to backend server 102 or ATM 106 for decoding of the personalized barcode. The backend server 102 or ATM 106 may decode the personalized barcode and authenticate the user at user device 104. Thereafter, backend server 102 may permit ATM 106 to complete the transaction.

ATM 106 may be associated or unassociated with backend server 102. For example, in some embodiments, ATM 106 may be managed by the same entity managing backend server 102. Alternatively, in some embodiments, ATM may be managed by a different entity than that managing backend server 102 and thus may be independent therefrom.

In some embodiments, ATM 106 may receive a request directly from backend server 102 to complete the transaction for a user at user device 104. In some embodiments, ATM 106 may request to complete a transaction for a user at user device 104 from pairing device 208 of backend server 102 (of FIG. 2). In the embodiments, ATM 106 may receive unique user information for generating and/or presenting the personalized barcode and for completing the transaction, which may include an identifier unique to the user which is also provided to the user device 104's mobile application 108. As such, ATM 106 may identify the user at user device 104 based on an identifier unique to the user provided to the user device 104's mobile application 108.

ATM 106 may comprise middleware 112 to perform actions required to complete the transaction (e.g., dispense cash). Middleware 112 may store data received from backend server 102 (e.g., rules for generating and presenting the personalized barcode, unique user information, and an identifier unique to the user), and may generate and/or present the personalized barcode for the user. Middleware 112 may also request updated and new rules for generating and presenting the personalized barcode. This is unlike previous systems, where information is consistently pushed to ATMs without requests therefor. As stated previously, the requests for the updated and new rules may be based on unique information received at ATM 106. This unique information may be a number of users visiting ATM 106 daily, a location of ATM 106 (in a city or suburb), and a number of fraudulent attempts on ATM 106, just to name a few examples.

In some embodiments, the ATM 106 may present a generic barcode—associated with mobile application 108—to confirm that the user of user device 104 is permitted to attempt to complete the transaction. After confirmation by backend server 102 or ATM 106, ATM 106 may present the personalized barcode. In some embodiments, ATM 106 may also detect when user device 104 is within a predetermined distance (e.g., 1.5 feet) based on a positioning system (e.g., Global Position Service) used by user device 104. ATM 106 may thereafter present the generic barcode or personalized barcode. After confirmation of the personalized barcode by backend server 102 or ATM 106, ATM 106 may automatically complete the transaction.

FIG. 2 illustrates an example backend server 102 of FIG. 1, according to some embodiments. In some embodiments, the backend server 102 may comprise a secure interface 202, a micro-service repository 204, a cardless service 206, a pairing service 208, a node packaging service 210, and/or a component library 212, which, as would be understood by a person of ordinary skill in the art, may be provided on the same device or separate devices of backend server 102. Secure interface 202 may permit secure communication with backend server 102 to initiate a transaction via a mobile application 108 on user device 104. Micro-service repository 204 may store all code and/or functions for performing the capabilities of the mobile application 108 (of FIG. 1), which may be independent of any other micro-service repositories. Cardless service 206 may inform ATM 106 to allow the completion of the transaction at ATM 106 and upon pairing via pairing service 208, may issue a request for ATM to perform a specific instruction. Pairing service 208 may pair a transaction from user device 104 with ATM 106 based on an identifier unique to the user. As described above, the pairing service 208 may be upon an request from a user to visit a particular ATM 106. Alternatively, the pairing may be upon a request from an ATM 106 that the user via user device 104 is currently visiting.

Node packaging service 210 may pull information from the component library 212 to display graphical user interface (GUI) elements on ATM 106 (of FIG. 1). GUI elements include any functions presented to the user on ATM 106 including, for example, data for generating and/or presenting personalized barcodes (e.g., personalized barcodes, rules for generating and presenting the personalized barcode, unique user information, and an identifier unique to the user). Based on the pulled information, node packaging service 210 may generate scripts for instructing ATM 106 how to present the functions. Node packaging service 210 may then send the instructions to ATM 106.

As stated above, component library 212 may store data to present GUI elements on ATM 106 (of FIG. 1). GUI elements may include any functions presented to the user on ATM 106 including a user interface for completing the transaction. As such, GUI elements may include data for generating and/or presenting personalized barcodes (e.g., rules for generating and presenting the personalized barcode, unique user information). Along these lines, as described above, component library 212 may periodically update the rules for generating and presenting the personalized barcode or may do so upon the request of ATM 106.

Figure 3:
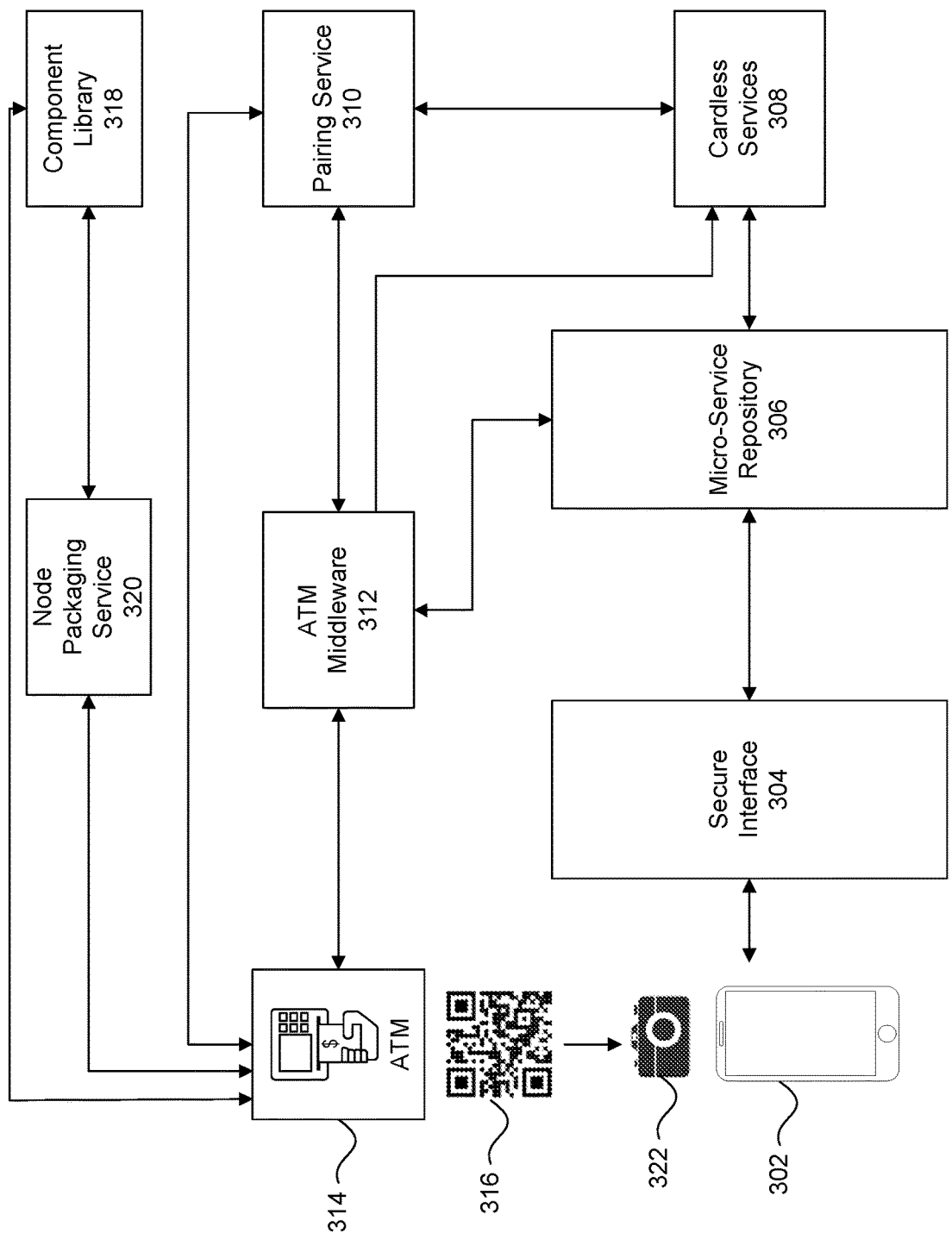
FIG. 3 illustrates a block diagram of components of backend server, user device, and ATM of FIGS. 1 and 2, according to some embodiments.
Figure 4F:
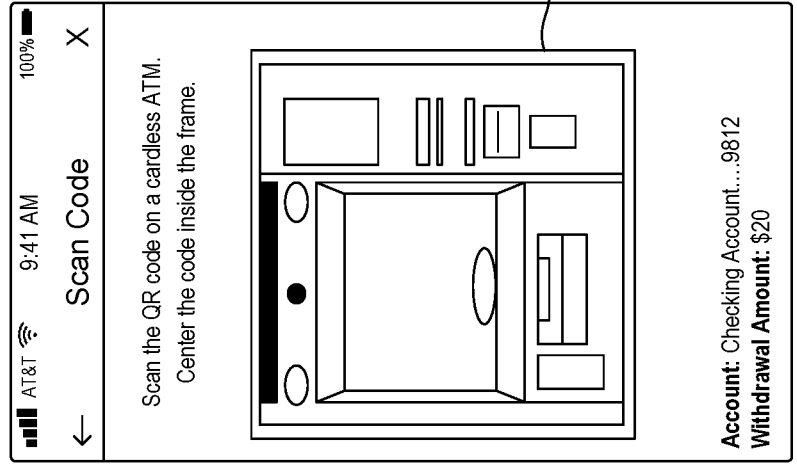
Figure 4E:

FIG. 3 illustrates a block diagram of components of backend server 102, user device 104, and ATM 106 of FIGS. 1 and 2 completing a transaction using a personalized barcode, according to some embodiments. In some embodiments, mobile device 302 may permit a user having an account at a banking institution to access a mobile application of the banking institution. Mobile device 302's mobile application may permit the user to interact with the banking institution through a secure interface 304. Secure interface 304 may provide a number of functions, which may be accomplished via micro-services provided by micro-service repository 306. For example, secure interface 304 may permit user device 104 to initiate a transaction (such as a withdrawal of cash) and to request the completion of a transaction using a personalized barcode. And micro-service repository 306 may store a micro-service for enabling functionality relating to completing the transaction using the personalized barcode. Micro-service repository 306 may then communicate with cardless services 308 and ATM middleware 312 to perform functions, such as completing the transaction using the personalized barcode.

After a user at mobile device 302 requests completion of the transaction using the personalized barcode, cardless services 308 may perform functions for permitting the user at mobile device 302 to do so at ATM 314. In some embodiments, cardless services 308 may request that the user do so at the ATM 314 via ATM middleware 312. In doing so, cardless services 308 can inform ATM 314 that the authenticated user has proper access to complete the transaction and is permitted to complete the transaction at ATM 314 even without the use of an ATM card. Cardless services 308 may also pair the transaction to ATM 314 to allow completion of the transaction at ATM 314. And if, with pairing complete through pairing service 310, cardless services 308 issues a request for ATM 314 to perform a specific transaction (e.g., providing cash to complete a cash withdrawal transaction), the instructions can be provided through ATM middleware 312 to direct the behavior of ATM 314.

Pairing service 310 may also handle pairing a transaction from mobile device 302 with ATM 314 based on an identifier unique to the user of mobile device 302 provided by the installed application. For example, in some embodiments, ATM 314 may display a personalized barcode 316 on its screen. This personalized barcode 316 may include an identifier associated with ATM 314 and/or the bank institution. In some embodiments, when mobile device 302 has requested the completion of a transaction through cardless services 308, the mobile application executing on mobile device 302 may instruct the user via mobile device 302 to visit ATM 314 to complete the transaction. In some embodiments, when mobile device 302 has request the completion of a transaction through cardless services 308, the mobile application executing on mobile device 302 may present via mobile device 302 a number of ATMs 314 to visit (e.g., 10 to 50) within a predefined area (5 miles, 10 miles, and 15 miles).

After identifying ATM 314 via pairing service 310, node packaging service 320 may retrieve data from component library 318 to generate instructions for ATM 314 to display the personalized barcode 316. The data retrieved from component library 318 may include personalized barcode 316 (or rules for generating personalized barcode 316), rules for presenting personalized barcode 316, and the identifier unique to the user of mobile device 302. As described above, node packaging service 320 may retrieve data from component library 318 and send instructions based thereon to ATM 314 based on the selection of ATM 314 by a user of mobile device 302 or detection of mobile device 302 by ATM 314.

Upon arriving at ATM 314, the user of mobile device 302 is then presented with personalized barcode 316 on the display screen of ATM 314. The mobile application executing on mobile device 302 may present the user with an option for obtaining this personalized barcode 316 (or other forms of personalized barcode) from the ATM 314. For example, the mobile application may access a camera feature to allow the user to acquire an image of personalized barcode 316 using camera 322 built into mobile device 302. The mobile device 302 may send this personalized barcode 316 to cardless services 308 and on to pairing service 310, which recognizes the identifier for ATM 314 and/or banking institution in scanned personalized barcode 316. Accordingly, pairing service 310 is able to pair the transaction initiated from mobile device 302 with ATM 314, specifically, on the basis of the identifier unique to the user.

In a further embodiment, personalized barcode 316 (or another form of barcode) may be received by camera 322 of mobile device 302 and processed by the application installed on mobile device 302. Barcodes, such as QR codes, that are formed in accordance with a specific standard are commonly readable by any reader that itself conforms to the barcode standards. For example, if camera 322 is capable of acquiring an image of personalized barcode 316 and a mobile application installed on mobile device 302 may read the barcode, then the mobile application installed on mobile device 302 would be able to obtain raw data present in any type of barcode (including a personalized QR code). Accordingly, a skilled artisan would understand that the mobile application installed on mobile device 302, along with camera 322 of mobile device 302, can be interfaced with any device—including handheld devices—capable of reading a barcode displayed on ATM 314.

FIGS. 4A-4H show user interfaces 400A-400H of an example application installed on user device 104 (of FIG. 1), in accordance with some embodiments. As illustrated, the application installed on user device 104 is provided by a banking institution on user device 104. User interfaces 400A-400E show the process of preparing the transaction for fulfillment by ATM 314 (of FIG. 3), and user interfaces 400F-400H illustrate the process of pairing the specific ATM 314 to the transaction of mobile device 302 (of FIG. 3) by scanning personalized barcode 316 using camera 322 of mobile device 302.

In the illustrated embodiment, user interface 400A presents information relating to an account of a user at the banking institution. From user interface 400A, a user may select a request 404 to perform a transaction that requires an ATM for fulfillment—in this case, "Get Cash at an ATM." User interface 400B permits the user to select an account from which to perform the ATM withdrawal. User interface 400C permits the user to select an amount for the ATM cash withdrawal, while user interface 400D permits the user to confirm details of the withdrawal (e.g., the account and the amount selected). After confirming, user interface 400E notifies the user that the transaction has been approved and is ready to be completed at an ATM. Although not depicted, the ATM may be selected by a user. Alternatively, the ATM may be a ATM (e.g., of a network of ATMs) designated by the entity managing backend server 102.

When user is at ATM 106 (of FIG. 1), user interface 400E may present an option ("Scan Code") allowing the user to scan a barcode (e.g., a personalized barcode). User interface 400F may then permit a user to scan the barcode presented on an ATM display. As discussed above, user device 104 (of FIG. 1) may scan the personalized barcode via camera 110 (of FIG. 1) installed on the user device 104. To do so, user interface 400F may include viewport 406 to permit the user to see what user device 104's camera 110 is acquiring. After receiving an image of the barcode, user interface 400G shows that the barcode was received and that the mobile application is processing the request to complete the transaction. After authorizing the transaction based on the received barcode, user interface 400H presents a confirmation screen that the transaction has been completed by the ATM 106.

Figure 5:
FIG. 5 illustrates an example interface for ATM of FIG. 1, according to some embodiments.

FIG. 5 illustrates a user interface 500 for ATM 106 (of FIG. 1), according to some embodiments. In some embodiments, as discussed above, ATM 106 may determine when the user device 104 (of FIG. 1) is within a predetermined distance (e.g., 1.5 feet). Accordingly, in some embodiments, when the user device 104 is within the predetermined distance from ATM 106, ATM 106 may present user interface 500. User interface 500 may automatically present a personalized barcode 502 upon ATM 106 detecting that the user device 104 is within the predetermined distance. User interface 500 may present personalized barcode 502 based on a number of rules, as discussed above, including, for example, to prevent fraud. As such, personalized barcode 502 may change, rotate, and flash, just to name a few examples.

Figure 6D:
FIGS. 6A-6D illustrate example personalized Quick Response (QR) codes, according to some embodiments.
Figure 6C:
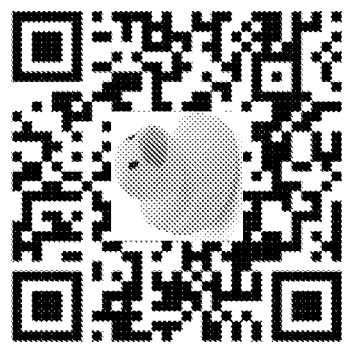
Figure 6B:
Figure 6A:

FIGS. 6A-6C illustrate example personalized barcodes, according to some embodiments. As discussed above, ATM 106 (of FIG. 1) may generate barcodes to present data unique to the user. The data unique to the user may be personal information (e.g., the user's address, last four digits of their social security number, and phone number). As such, the data unique to the user may be selected by a user and/or randomly selected by backend server 102. The data unique to the user may also be a unique image of an object (e.g., beach, street sign, and car) that only the user is aware of.

In some embodiments, as illustrated in FIGS. 6A-6D, the barcodes may be QR codes. As would be understood by a person of ordinary skill in the art, QR barcodes are machine-readable code consisting of an array of black and white squares that store information. FIG. 6A depicts an example QR code for a particular user that stores unique information relating to that user. As such, the stored information may be unique to the user and different from the data depicted to the user via the array of black and white squares. For example, as illustrated in FIG. 6B, the array of black and white squares may be designed to depict a face (e.g., the user's face). And as illustrated in FIGS. 6C and 6D, the QR code may be designed around an image selected by a user (e.g., the user's face or a duck). Along these lines, in some embodiments, the QR codes may be color or black and white.

Figure 7:
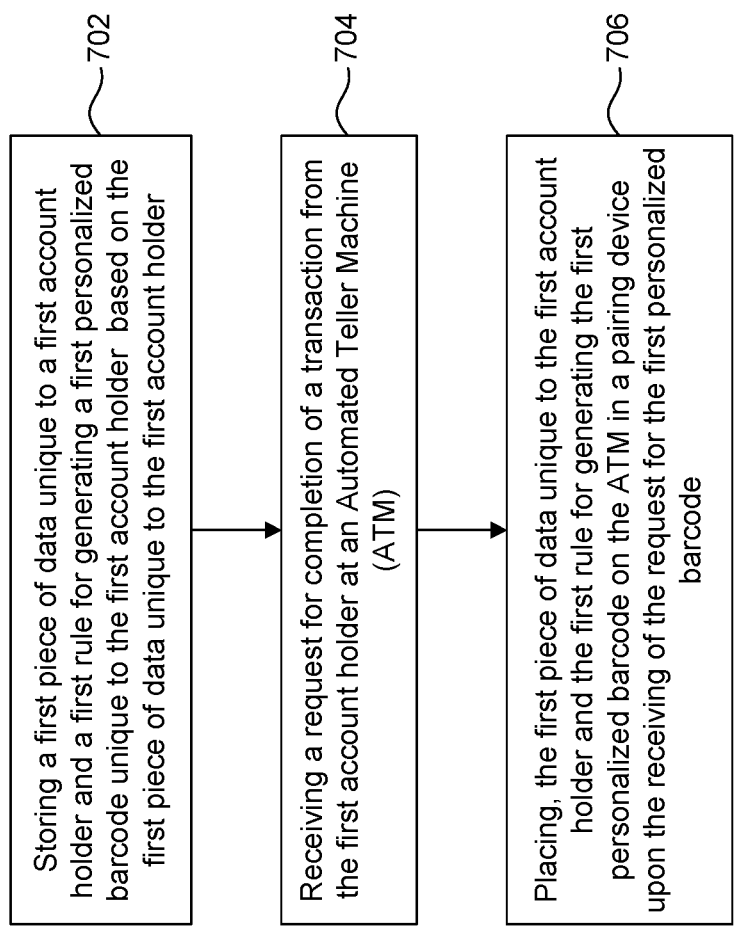
FIGS. 7 and 8 illustrate flowcharts of example methods for completing a transaction at a device using a personalized barcode, according to some embodiments.
Figure 8:
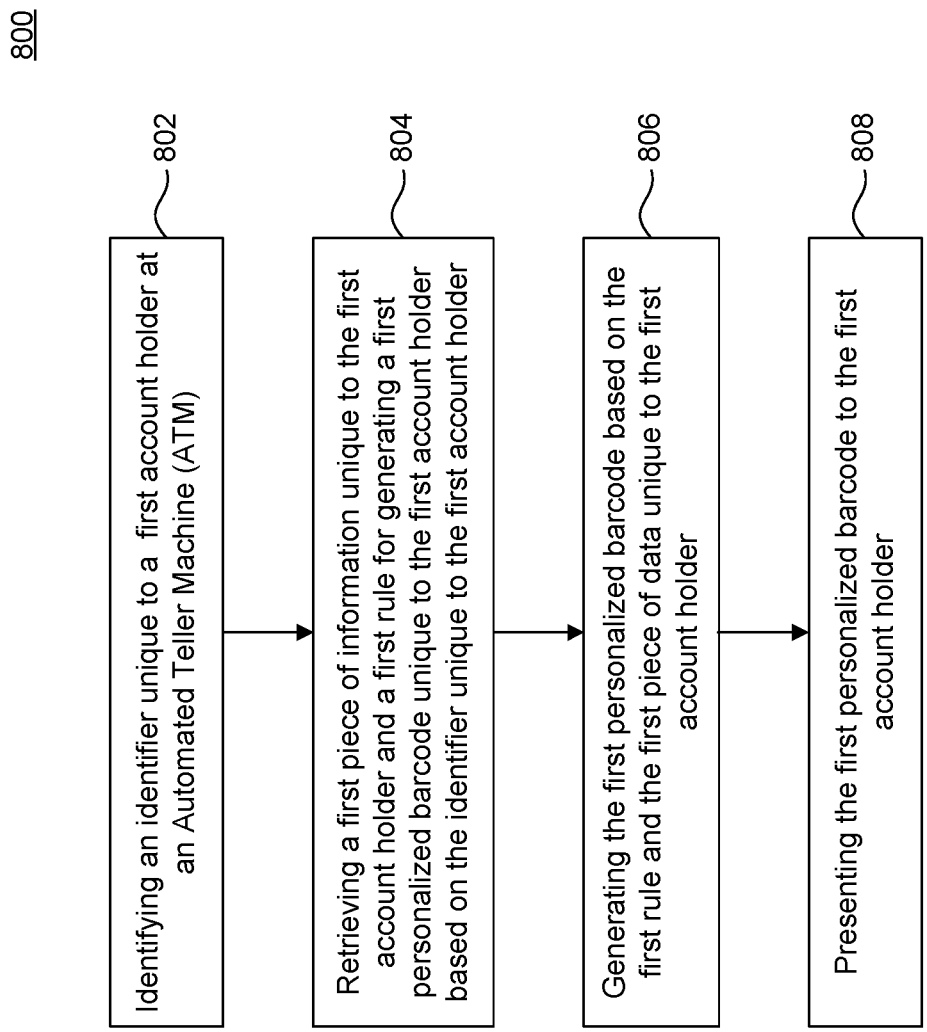

FIGS. 7 and 8 illustrate flowcharts of methods 700/800 for verifying a document, according to some embodiments. Methods 700/800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 7 and 8, as will be understood by a person of ordinary skill in the art.

Referring now to FIG. 7, method 700 shall be described with reference to FIGS. 1-3, 5 and 6. However, method 700 is not limited to those example embodiments.

In 702, backend server 102 may store a first piece of data unique to a first account holder and a first rule for generating a first personalized barcode 502/602-608 unique to the first account holder based on the first piece of data unique to the first account holder. In some embodiments, backend server 102 may be managed by a financial institution that has a bank account for the financial institution.

In 704, backend server 102 may receive a request for completion of a transaction from the first account holder. In some embodiments, the request may be from user device 104/302 to complete the transaction at an ATM without a physical card.

In 706, backend server 102 may place the first piece of data unique to the first account holder and the first rule for generating the first personalized barcode 502/602-608 in a pairing service 208/310 upon the receiving of the request for the completion of the transaction.

The pairing service 208/310 may be in communication with one or more ATMs 106 configured to access the first piece of data unique of the first account holder and the first rule for generating the first personalized barcode 502/602-608. As such, a particular ATM 106 may be configured to identify that the first account holder at the particular ATM 106 has the first piece of data unique to the first account holder and the first rule for generating the first personalized barcode 502/602-608 stored on the pairing service 208/310. Thereafter, the particular ATM 106 may generate the first personalized barcode 502/602-608 based on the first rule and the first piece of data unique to the first account holder and present the first personalized barcode to the first account holder.

Referring now to FIG. 8, method 800 shall be described with reference to FIGS. 1 and 5. However, method 800 is not limited to those example embodiments.

In 802, ATM 106 identifies an identifier unique to a first account holder at an ATM 106.

In 804, ATM 106 retrieves a first piece of information unique to the first account holder and a first rule for generating a first personalized barcode 502/602-608 unique to the first account holder based on the identifier unique to the first account holder.

In 806, ATM 106 generates the first personalized barcode 502/602-608 based on the first rule and the first piece of data unique to the first account holder.

In 808, ATM 106 presents the first personalized barcode 502/602-608 to the first account holder.

Figure 9:
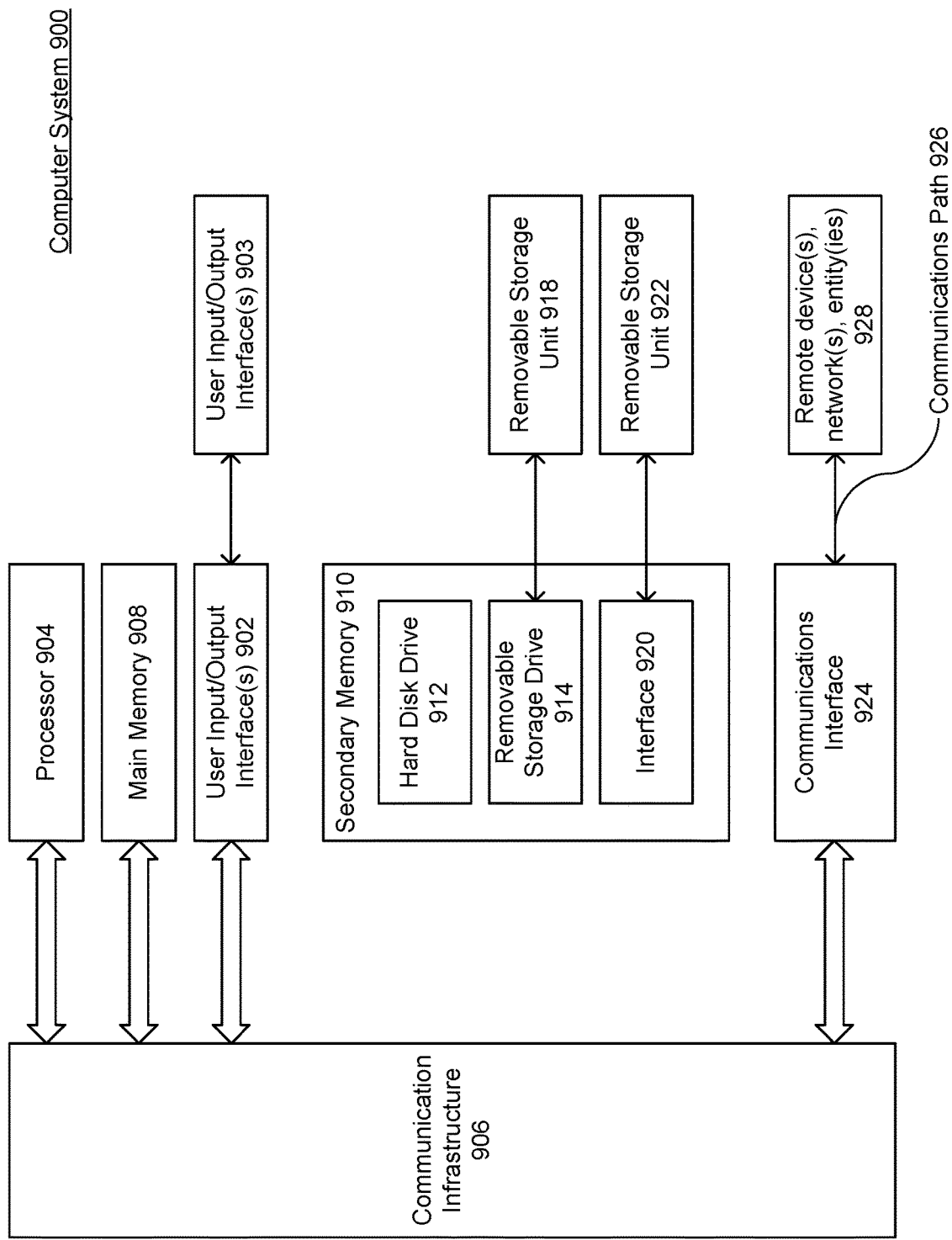
FIG. 9 illustrates an example computer system useful for implementing various embodiments.

Various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/or any other computer data storage device. Removable storage drive 914 may read from and/or write to a removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communications or network interface 924. Communications interface 924 may enable computer system 900 to communicate and interact with any combination of external devices, external networks, external entities, etc. (individually and collectively referenced by reference number 928). For example, communications interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communications path 926.

Computer system 900 may also be any of a personal digital assistant (PDA), desktop workstation, laptop or notebook computer, netbook, tablet, smartphone, smartwatch or another wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents.

What is claimed is:

1. A computer-implemented method, comprising:
receiving, by one or more computer devices, a request to complete a transaction from a mobile application on a user device;
pairing, by the one or more computer devices, the transaction with an Automated Teller Machine (ATM) based on an identifier unique to a user;
retrieving, by the one or more computer devices, information unique to the user based on the identifier unique to the user;
generating, by the one or more computer devices, a personalized barcode based on the information unique to the user;
retrieving, by the one or more computer devices, a rule for presenting the personalized barcode, the rule comprising at least one of: i) when the personalized barcode should be presented, ii) how long the personalized barcode is to be presented, or iii) how the personalized barcode should move when presented on the ATM;
detecting, by the one or more computer devices, when the user device is within a predetermined distance from the ATM; and
presenting, by the one or more computer devices, the personalized barcode to the user at the ATM based on the user device being within the predetermined distance.

2. The computer-implemented method of claim 1, wherein the pairing is completed based on a request from the user to visit the ATM.

3. The computer-implemented method of claim 1, wherein the detecting when the user device is within the predetermined distance is based on position data received from the user device.

4. The computer-implemented method of claim 1, wherein the predetermined distance is approximately 1.5 feet.

5. The computer-implemented method of claim 1, further comprising,
requesting, by the one or more computer devices, an update to the rule based on unique information received from the ATM, the unique information comprising at least one of: a number of users visiting the ATM daily, a location of the ATM, or a number of fraudulent attempts to complete transactions at the ATM.

6. The computer-implemented method of claim 1, wherein how the personalized barcode should move comprises at least one of blinking, rotating, traversing, flashing, or increasing/decreasing in size.

7. The computer-implemented method of claim 1, wherein the personalized barcode is a quick response (QR) code.

8. The computer-implemented method of claim 7, wherein the information unique to the user is encoded in the QR code.

9. A system, comprising:
   a memory configured to store operations; and
   one or more processors configured to perform the operations, the operations comprising:
      receiving a request to complete a transaction from a mobile application on a user device;
      pairing the transaction with an Automated Teller Machine (ATM) based on an identifier unique to a user;
      retrieving information unique to the user based on the identifier unique to the user;
      generating a personalized barcode based on the information unique to the user;
      retrieving a rule for presenting the personalized barcode, the rule comprising at least one of: i) when the personalized barcode should be presented, ii) how long the personalized barcode should be presented, or iii) how the personalized barcode should move when presented on the ATM;
      detecting when the user device is within a predetermined distance from the ATM; and
      presenting the personalized barcode to the user at the ATM based on the user device being within the predetermined distance.

10. The system of claim 9, wherein the pairing is completed based on a request from the ATM.

11. The system of claim 9, wherein the pairing is completed based on an identifier associated with the ATM being included in the personalized barcode.

12. The system of claim 9, wherein the detecting when the user device is within the predetermined distance is based on position data received from the user device.

13. The system of claim 9, wherein the predetermined distance is approximately 1.5 feet.

14. The system of claim 9, the operations further comprising,
   requesting an update to the rule based on unique information received from the ATM, the unique information comprising at least one of: a number of users visiting the ATM daily, a location of the ATM, or a number of fraudulent attempts to complete transactions at the ATM.

15. The system of claim 9, wherein how the personalized barcode should move comprises at least one of blinking, rotating, traversing, flashing, or increasing/decreasing in size.

16. The system of claim 9, wherein the personalized barcode is a quick response (QR) code.

17. The system of claim 16, wherein the information unique to the user is encoded in the QR code.

18. A computer-readable storage device having instructions stored thereon, execution of which, by one or more processing devices, causes the one or more processing devices to perform operations comprising:
   retrieving information unique to a user and a rule for generating a personalized barcode based on an identifier unique to the user;
   generating the personalized barcode based on the information unique to the user and the rule for generating the personalized barcode;
   retrieving a rule for presenting the personalized barcode, the rule for presenting the personalized barcode comprising at least one of: i) when the personalized barcode should be presented, ii) how long the personalized barcode should be presented, or iii) how the personalized barcode should move when presented on the ATM;
   detecting when the user device is within a predetermined distance from the ATM; and
   presenting the personalized barcode to the user at the ATM based on the user device being within the predetermined distance.

* * * * *